(12) United States Patent
Chen et al.

(10) Patent No.: US 11,629,253 B1
(45) Date of Patent: Apr. 18, 2023

(54) ELASTOMERIC SILICONE MATERIALS AND THEIR APPLICATIONS

(71) Applicants: DOW SILICONES CORPORATION, Midland, MI (US); DOW GLOBAL TECHNOLOGIES LLC, Midland, MI (US)

(72) Inventors: Yusheng Chen, Shanghai (CN); Peng Wang, Shanghai (CN); Xiangyang Tai, Shanghai (CN); Yi Guo, Shanghai (CN); Rui Wang, Shanghai (CN); Yi Zhang, Shanghai (CN); Qing Shi, Shanghai (CN)

(73) Assignees: DOW SILICONES CORPORATION, Midland, MI (US); DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 17/799,776

(22) PCT Filed: Feb. 17, 2020

(86) PCT No.: PCT/CN2020/075489
§ 371 (c)(1),
(2) Date: Aug. 15, 2022

(87) PCT Pub. No.: WO2021/163827
PCT Pub. Date: Aug. 26, 2021

(51) Int. Cl.
*C08L 83/04* (2006.01)
*C08G 77/20* (2006.01)
(Continued)

(52) U.S. Cl.
CPC .............. *C08L 83/04* (2013.01); *C08G 77/12* (2013.01); *C08G 77/20* (2013.01); *C08K 3/36* (2013.01); *C08L 99/00* (2013.01)

(58) Field of Classification Search
None
See application file for complete search history.

(56) References Cited

U.S. PATENT DOCUMENTS

| 6,124,407 A | 9/2000 | Lee et al. |
| 2003/0049465 A1 | 3/2003 | Kerboua et al. |

(Continued)

FOREIGN PATENT DOCUMENTS

| CN | 102424725 A | 4/2012 |
| CN | 102131873 B | 5/2014 |

(Continued)

OTHER PUBLICATIONS

Machine translation of CN-110577744, translation generated Feb. 2023, 15 pages. (Year: 2023).*

(Continued)

*Primary Examiner* — Robert S Loewe
(74) *Attorney, Agent, or Firm* — Warner Norcross + Judd LLP

(57) ABSTRACT

An article adapted to receive multiple battery cells, such as a battery module, which provides thermal insulation between adjacent battery cells using thermally insulating layers comprising a ceramifiable elastomeric silicone material, using fumed silica (amorphous $SiO_2$) or fumed silica (amorphous $SiO_2$)+quartz (crystalline $SiO_2$). There is also provided, the use of said ceramifiable elastomeric silicone material as a means of delaying and/or preventing thermal runaway in such an article. Typically, the battery cells for which this article is designed are lithium-ion battery cells.

10 Claims, 1 Drawing Sheet

(51) Int. Cl.
*C08K 3/36* (2006.01)
*C08G 77/12* (2006.01)
*C08L 99/00* (2006.01)

(56) References Cited

U.S. PATENT DOCUMENTS

| | | | | |
|---|---|---|---|---|
| 2006/0258819 | A1* | 11/2006 | Woerner | C08L 83/04 524/588 |
| 2011/0166288 | A1 | 7/2011 | Woerner | |
| 2015/0287860 | A1* | 10/2015 | Tsukada | B32B 37/10 136/251 |
| 2019/0386360 | A1* | 12/2019 | Lee | C08L 83/04 |

FOREIGN PATENT DOCUMENTS

| | | | | |
|---|---|---|---|---|
| CN | 105860536 | A | | 8/2016 |
| CN | 106349711 | A | | 1/2017 |
| CN | 106833509 | A | | 6/2017 |
| CN | 108165015 | A | | 6/2018 |
| CN | 108192354 | A | | 6/2018 |
| CN | 105694471 | B | | 5/2019 |
| CN | 110577744 | A * | 12/2019 | C08L 83/04 |
| EP | 2779177 | A1 | | 9/2014 |
| GB | 2360780 | A | | 10/2001 |
| JP | 2000129132 | A | | 5/2000 |
| WO | 0240592 | A2 | | 5/2002 |
| WO | 2004046267 | A2 | | 6/2004 |

OTHER PUBLICATIONS

International Search Report for PCT/CN2020/075488 dated Nov. 20, 2020, 5 pages.
International Search Report for PCT/CN2020/075489 dated Oct. 21, 2020, 3 pages.
Machine assisted English translation of CN108192354 obtained from https://patents.google.com/patent on Aug. 17, 2022, 9 pages.
Machine assisted English translation of CN102424725 obtained from https://patents.google.com/patent on Aug. 17, 2022, 9 pages.
Machine assisted English translation of CN105860536 obtained from https://patents.google.com/patent on Aug. 17, 2022, 10 pages.
Machine assisted English translation of CN105694471 obtained from https://patents.google.com/patent on Aug. 17, 2022, 9 pages.
Machine assisted English translation of CN108165015 obtained from https://patents.google.com/patent on Aug. 17, 2022, 12 pages.
Machine assisted English translation of CN106349711 obtained from https://patents.google.com/patent on Aug. 17, 2022, 10 pages.
Machine assisted English translation of CN106833509 obtained from https://patents.google.com/patent on Aug. 17, 2022, 7 pages.

* cited by examiner

ELASTOMERIC SILICONE MATERIALS AND THEIR APPLICATIONS

CROSS-REFERENCE TO RELATED APPLICATIONS

This application is the National Stage of, and claims priority to and all advantages of, International Appl. No. PCT/CN2020/075489 filed on 17 Feb. 2020, the content of which is hereby incorporated by reference.

TECHNICAL FIELD

This disclosure relates to a battery module comprising a ceramifiable elastomeric silicone material and the use of said ceramifiable elastomeric silicone material as a means of delaying and/or preventing thermal runaway in a battery module such as a nodule of lithium-ion batteries.

BACKGROUND

Rechargeable batteries such as lithium-ion batteries (also referred to as Li-ion batteries or LIBs) are increasingly being used in modules and/or packs of modules for a variety of applications such as electric-vehicle batteries (EVBs) in electric and hybrid (electric and petrol/diesel) powered vehicles with a view to reducing and ultimately eliminating green-house gas emissions therefrom. EVBs are battery packs used to power the propulsion system of electric and hybrid vehicles and as such are designed to give power over sustained periods of time, as opposed to starting, lighting and ignition (SLI) batteries. Lithium-ion batteries are increasingly becoming the preferred option. For the avoidance of doubt in this disclosure and in consideration of usable space from a practical perspective, individual battery cells (sometimes referred to herein as cells) are aligned in battery modules and a battery pack is constituted by a plurality of electrically interconnected battery modules.

The three main constituents in a lithium-ion battery are:
an anode (negative electrode);
a cathode (positive electrode) and
an electrolyte.
In use in a lithium-ion battery, lithium ions move from the anode through said electrolyte to the cathode during discharge, and in the reverse direction when being charged.

A wide variety of materials may be used as the anode in a lithium-ion battery but by far the most commercially popular is graphite. Currently the preferred material for the cathode in a lithium-ion battery is selected from one of three materials:
  (i) a layered oxide (such as lithium cobalt oxide),
  (ii) a polyanion (such as lithium iron phosphate) or
  (iii) a spinel (such as lithium manganese oxide).

Lithium-ion batteries, unlike rechargeable batteries with water-based electrolytes, have a potentially hazardous pressurised flammable liquid electrolyte, and require strict quality control during manufacture. A large variety of non-aqueous materials have been proposed and/or used as the electrolyte in a lithium-ion battery. One example of a suitable electrolyte is a mixture of organic carbonates e.g. ethylene carbonate and/or diethyl carbonate containing sources of lithium ions, for example lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), and lithium triflate ($LiCF_3SO_3$).

In order to provide power over sustained periods of time, i.e. to enable acceptably long journeys between recharges, EVBs are generally provided in battery packs which are fitted in suitable spaces within the vehicle such as in the car boot or luggage compartment. Irrespective of the position of the pack the casing must protect the occupants of the vehicle from the lithium-ion batteries in case of a malfunction.

When a lithium-ion battery cell malfunctions (for whatever reason) the cell typically overheats and/or becomes over charged which may consequently lead to a fire and/or explosion. Such malfunctions might be caused, for the sake of example, by short circuiting, by being physically damaged i.e. being crushed, or by being subjected to a higher electrical load without having overcharge protection. If present in a multi-cell battery module of lithium-ion batteries, the overheating of a first cell is likely to propagate similar occurrences in adjacent cells resulting in multiple cells in a battery module overheating and failing potentially leading to a "thermal runaway" and cell rupture.

A thermal runaway is usually initiated by the malfunction of one of the battery cells in a battery module leading to that cell releasing heat abnormally and to a sudden increase in the battery cell's temperature. Once the temperature exceeds a threshold of e.g. about 150° C. or thereabouts, the constituents in the malfunctioning cell initiate a self-heating, autocatalytic, thermal decomposition exothermic reaction, where the temperature of the battery increases rapidly, e.g. at a rate of more than 20° C. per minute, with the temperature of the battery potentially reaching 500° C. or even 1000° C. In the absence of good insulation and heat dissipation structures in the battery module in which the malfunctioning battery is housed, the thermal energy released consequently heats up neighboring battery cells. resulting in a "thermal runaway" within the battery module. When thermal runaway has commenced inside the battery module it cannot be controlled effectively, potentially resulting in combustive exothermic reactions followed by the release of large amounts of flammable electrolyte gas and battery material decomposition gas (e.g. $CO_2$, $CO$, and $H_2$) and possible explosions.

Circuitry has been developed to disconnect lithium-ion cells (and battery modules) if/when the voltage generated is outside a predefined safe voltage range per cell. or when overcharged or discharged. However, lithium battery packs, are still susceptible to the aforementioned thermal runaway and cell rupture situations in the event of damage or malfunction.

Hence, the provision of safety measures to enable occupants to exit a vehicle in the event of such a malfunction and to protect them from an immediate risk of toxic gases entering the passenger compartment e.g. by the provision of a sturdy battery pack which can withstand a certain amount of pressure increase because of gas generation and to minimise the effect of the potential for thermal runaway propagation between adjacent cells. One proposed solution has been the provision of coated aerogel felt materials between adjacent battery cells in a battery module to slow down heat transfer.

However, said coated aerogel felt materials cause amorphous aerogel silica to disperse into the working environment, requiring more protective equipment during cutting, packaging, storing and transporting processes. Furthermore, whilst these materials provide good initial thermal insulation performance, performance deteriorates dramatically because of a significant decrease in thickness occurring as the pressure within the battery module increases.

SUMMARY

There is provided an article adapted to receive multiple battery cells which provides thermal insulation between adjacent battery cells by the provision of a thermally insulating layer of a ceramifiable elastomeric silicone material between adjacent batteries cells, which ceramifiable elastomeric silicone material is a cured product of a silicone rubber composition comprising:
(i) one or more polydiorganosiloxanes having a weight average molecular weight of from 200,000 to 800,000 g/mol having between 0.01 to 1% of alkenyl and/or alkynyl groups in an amount of from 30 to 70% wt. of the composition;
(ii) a fumed silica filler in an amount of from 28.0 to 40.0% wt. which fumed silica filler may be partially replaced with
(iii) quartz having a particle size of from 1 to 30 μm wherein when quartz is present, the fumed silica and the quartz are each present in an amount ≥10% wt. of the composition, the maximum total combined amount of fumed silica and quartz present is 40% wt. of the composition and that:—
[Total % wt. fumed silica]+[half the % wt. of quartz] is greater than or equal to (≥) 28% wt. of the composition;
   (iv) a curing agent selected from
      (a) an organic peroxide; or
      (b) a hydrosilylation cure package comprising (b) (i) a hydrosilylation catalyst and (b) (ii) an organopolysiloxane cross-linker having at least three hydrogen groups per molecule; and
   component (v) when curing agent (iv) is (a) an organo peroxide or optionally component (vi) when curing agent (iv) is (b) a hydrosilylation cure package wherein
      (v) is a platinum metal, or a compound or complex of a platinum group metal; and
      (vi) is a hydrosilylation cure inhibitor.

In one embodiment said article is a battery module comprising a casing adapted to receive multiple battery cells and a thermally insulating layer of a ceramifiable elastomeric silicone material to thermally insulate adjacent batteries cells, when present, which ceramifiable elastomeric silicone material is a cured product of the aforementioned silicone rubber composition.

In a further embodiment the article is a battery module comprising a casing, a plurality of battery cells and a thermally insulating layer of a ceramifiable elastomeric silicone material sandwiched between adjacent batteries cells, which ceramifiable elastomeric silicone material is a cured product of the aforementioned silicone rubber composition.

In a further embodiment the article is a battery pack containing multiple battery modules as described above.

In a further embodiment a method for thermally insulating adjacent battery cells in an article designed to receive multiple battery cells by the provision of a thermally insulating layer of ceramifiable elastomeric silicone material between said adjacent batteries cells, which ceramifiable elastomeric silicone material is a cured product of a silicone rubber composition comprising:
(i) one or more polydiorganosiloxanes having a weight average molecular weight of from 200,000 to 800,000 g/mol having between 0.01 to 1% of alkenyl and/or alkynyl groups in an amount of from 30 to 70% wt. of the composition;
(ii) a fumed silica filler in an amount of from 28.0 to 40.0% wt. which fumed silica filler may be partially replaced with
(iii) quartz having a particle size of from 1 to 30 μm wherein when quartz is present, the fumed silica and the quartz are each present in an amount ≥10% wt. of the composition, the maximum total combined amount of fumed silica and quartz present is 40% wt. of the composition and that:
[Total % wt. fumed silica]+[half the % wt. of quartz] is ≥28% wt. of the composition;
   (iv) a curing agent selected from
      (a) an organic peroxide; or
      (b) a hydrosilylation cure package comprising (b) (i) a hydrosilylation catalyst and (b) (ii) an organopolysiloxane cross-linker having at least three hydrogen groups per molecule; and component (v) when curing agent (iv) is (a) an organo peroxide or optionally component
   (vi) when curing agent (iv) is (b) a hydrosilylation cure package wherein
      (v) is a platinum metal, or a compound or complex of a platinum group metal; and
      (vi) is a hydrosilylation cure inhibitor.

There is further provided, a use of a ceramifiable elastomeric silicone material as a thermally insulating layer between adjacent battery cells in an article adapted to receive multiple battery cells, wherein said ceramifiable elastomeric silicone material is the cured product of a silicone rubber composition comprising:
(i) one or more polydiorganosiloxanes having a weight average molecular weight of from 200,000 to 800,000 g/mol having between 0.01 to 1% of alkenyl and/or alkynyl groups in an amount of from 30 to 70% wt. of the composition;
(ii) a fumed silica filler in an amount of from 28.0 to 40.0% wt. which fumed silica filler may be partially replaced with
(iii) quartz having a particle size of from 1 to 30 μm wherein when quartz is present, the fumed silica and the quartz are each present in an amount ≥10% wt. of the composition, the maximum total combined amount of fumed silica and quartz present is 40% wt. of the composition and that:
[Total % wt. fumed silica]+[half the % wt. of quartz] is ≥28% wt. of the composition;
(iv) a curing agent selected from
   (a) an organic peroxide; or
   (b) a hydrosilylation cure package comprising (b) (i) a hydrosilylation catalyst and (b) (ii) an organopolysiloxane cross-linker having at least three hydrogen groups per molecule; and
component (v) when curing agent (iv) is (a) an organo peroxide or optionally component (vi) when curing agent (iv) is (b) a hydrosilylation cure package wherein
   (v) is a platinum metal, or a compound or complex of a platinum group metal; and
   (vi) is a hydrosilylation cure inhibitor.

There is further provided, a use of a ceramifiable elastomeric silicone material as a thermally insulating layer between battery cells in a battery module wherein said ceramifiable elastomeric silicone material is the cured product of a silicone rubber composition as hereinbefore described.

DETAILED DESCRIPTION

For the avoidance of doubt it is to be understood that in the above and all other references to % weight (% wt.) of the composition in this disclosure, the total % wt. of all compositions is in all instances is 100%. The one or more battery cells in each battery module are preferably lithium ion battery cells, battery modules as hereinbefore described are preferably lithium ion battery modules and battery packs comprising one or more battery modules as hereinbefore described are lithium ion battery packs.

When the article is a battery module, each battery module as hereinbefore described is electrically interconnected with other battery modules in a battery pack. The electrical interconnection may be in series or in parallel, as required. Each battery module as hereinbefore described comprises a casing containing a plurality of battery cells. The individual battery cells in an article such as a battery module as hereinbefore described may be of any suitable shape, for example they may be prismatic, cylindrical or in a pouch form but must be electrically connectable with other cells within the battery module. The thermally insulating layer between battery cells in said article such as a battery module is provided between adjacent cells such that in the event of a malfunction the thermally insulating layer will prevent the excessive heat increase from being immediately transferred to other nearby/adjacent battery cells with the side of the thermally insulating layer facing the malfunctioning cell tending to ceramify due to the heat released and raise in temperature. The side of the thermally insulating layer of ceramifiable elastomeric silicone material remote from the malfunctioning cell, at least initially, remains elastomeric protecting said adjacent battery cells from the malfunctioning battery cell.

The thermally insulating layer of ceramifiable elastomeric silicone material may be designed to accommodate battery cells of any suitable shape. For example, in the case of prismatic shaped batteries the thermally insulating layer may be sandwiched between adjacent batteries (as depicted in FIG. 1 herein) or may be provided in a crosshatch form providing individual pockets for each battery cell. However for other shapes the thermally insulating layer may be produced with a view to being wrapped around each individual cell or may be produced as a housing, shaped to house an individual battery and thermally isolate same from its neighbours or the like with each battery module comprising an equal number of housings as battery cells.

An article such as a battery module as hereinbefore described is required to provide mechanical and electrical interfaces to other battery modules and may also comprise, for the sake of example, cooling mechanisms, temperature monitors, voltage monitors and the like. Hence, the casing of a battery module as hereinbefore described is sized and designed to both accommodate a predetermined number of individual battery cells and if desired said other systems. In one embodiment the battery cells and battery modules are prismatic.

Battery module casings may be made from any suitable material, for example metals or injection moulded plastics and may also incorporate insert moldings in which interconnection strips and terminals are moulded into plastic parts. Small components and/or sub-assemblies may be encapsulated in the casing by any suitable means e.g. by over molding for ease of storage and/or protection.

The casing of a battery module as hereinbefore described (and/or individual battery cell therein) may comprise a thinning area or burst plate. This provides a weakened area in the casing which is designed to prevent the inner pressure within the battery module or battery to exceed a predetermined value. If a predetermined pressure value is reached due to the malfunction of one or more cells the weakening or burst plate will be forced open and will enable gases to escape thereby preventing further pressure build up within the battery cell or battery module concerned.

In one embodiment herein there is provided a battery pack comprising at least one battery module as described above, alternatively two or more battery modules as described above.

Battery pack designs for e.g. electric-vehicle batteries are complex but incorporate a combination of several simple mechanical and electrical component systems which perform the basic required functions of the pack. The battery packs therefore additionally comprise one or more of the following:
  (i) support electronics;
  (ii) heaters (to extend the lower working temperature or cells) having their own control circuits;
  (iii) coolers;
  (iv) Fixing points and methods and interconnections;
  (v) Control systems to keep the battery modules/cells within a predefined specified operating range e.g. for monitoring the battery status and controlling energy flows and to protect them from abuse;
  (vi) fuel gauging means to estimate the state of charge (SOC); and/or
  (vii) communications systems for communicating with other systems e.g. other vehicle systems.

A battery pack as described above has to fit the space provided in the article for which it is providing power, e.g. a vehicle. This may dictate the shape of the battery modules and indeed individual cells and consequently the shape and/or form of the thermally insulating layer between adjacent battery cells in a battery module as described herein. In some designs the battery pack forms part of the outer case of the end-product. The colours and textures of the battery pack casing must match the rest of the product. Such designs may be required to incorporate a mechanical connection means to hold the battery pack in place. Said mechanical connection means (e.g. a latch) as well as electrical terminals and the like must interface with other parts of the article to be powered by the battery pack. Any suitable material may be used for this for example ABS polymers may be utilised.

The thermally insulating layer described above is designed to keep a battery cell malfunction localised within said article such as a battery module and in the event of a fire provide a ceramified layer between adjacent batteries in a battery module to prevent or at least delay the potential for thermal runaway propagation within the whole of the article e.g. battery module so as to provide safety protection in the event of the thermal runaway of one battery cell in said battery module.

Therefore, when any one of the battery cells in an article such as a battery module as hereinbefore described releases heat abnormally due to short-circuit, overcharging, or other reasons, the thermal runaway of the cell concerned can be isolated to prevent or delay the propagation of thermal runaway through further cells in the battery module. The heat diffusion from the battery cell to the neighboring battery cells can be effectively insulated by the heat insulation layer. In addition, for some battery modules having control circuit boards disposed in the battery module casing, the composite heat conduction plate of the disclosure can be disposed between the battery and the circuit board and between battery and the connecting circuit to reduce the battery heating problem caused by the circuit board and the circuit.

As mentioned elsewhere, when a battery cell malfunctions, the heat generated causes a pressure build-up of gases initially within cell but ultimately if the cell fractures within. Such a pressure build-up can be to a pressure equal or greater than ($\geq$) 0.9 MPa and is caused by a build-up heated gas (such as $CO_2$, CO, and $H_2$) and/or liquid e.g. electrolyte resulting from the failed cell and/or battery module. Analysis of failure mode and behavior of lithium ion battery cells has indicated that, in the event of a thermal runaway in a battery cell occurring, temperatures may rise, for example, say 595° C. in 400 sec and a consequential pressure build up to, for the sake of example 0.85 MPa, alternatively 0.9 MPa or even greater may occur in the event of a malfunctioning cell. It has been found that the current aerogel materials used may lose their structure under such pressures whereas a thermally insulating layer as hereinbefore described which is designed to ceramify at least partially retains its form and therefore remains thermally insulating. A rupture disc housed on top of the cell is designed to rupture when the pressure reaches predetermined value such as e.g. 0.85 MPa, alternatively 0.9 MPa resulting in said gases and/or liquids e.g. electrolyte and decomposed liquid electrolytes being released from the malfunctioning cell. Even so, whilst this relieves the pressure build-up, e.g. the pressure will reduce to a more manageable level e.g. 0.3 MPa the cell remains at the excessively high temperature remains and if transferred to other cells in the battery module can initiate thermal run-away in the remaining cells in the battery module.

Having a thermally insulating layer as described above as an insulating layer between adjacent battery cells avoid or delay thermal run-away to provide enough passenger evacuation time with the intention of providing enough time to enable the driver and passengers to exit a vehicle or the like.

The thermally insulating layer as described above is ceramifiable and it has been determined that if the thermally insulating layer in contact with a battery cell undergoing thermal runaway becomes ceramified because of the heat/fire caused the part of the thermally insulating layer remote therefrom may remain unceramified and have a sufficient thickness, e.g. ≥1.5 mm, to slow down heat transfer to adjacent cells at same time The composition may include one or more optional additives but the total weight % of the composition is 100 wt. %. The alkenyl and/or alkynyl content of polymer (i) is determined using quantitative infra-red analysis in accordance with ASTM E168.

Component (i) of the silicone rubber composition herein is one or more polydiorganosiloxanes having a weight average molecular weight of from 200,000 to 800,000 g/mol and between 0.01 to 1% of alkenyl and/or alkynyl groups determined using quantitative infra-red analysis in accordance with ASTM E168, in an amount of from 30 to 70% wt. of the composition.

Weight average molecular weight (Mw) (and number average molecular weight (Mn)) of silicone can also be determined by Gel permeation chromatography (GPC). This technique is a standard technique, and yields values for Mw (weight average), Mn (number average) and polydispersity index (PI) (where PI=Mw/Mn). The Mw value provided in this application have been determined by GPC and represent a typical value.

The polydiorganosiloxane polymer has multiple units of the formula (I):

$$R_aSiO_{(4-a)/2} \qquad (I)$$

in which each R is independently selected from an aliphatic hydrocarbyl, aromatic hydrocarbyl, or organyl group (that is any organic substituent group, regardless of functional type, having one free valence at a carbon atom). Saturated aliphatic hydrocarbyls are exemplified by, but not limited to alkyl groups such as methyl, ethyl, propyl, pentyl, octyl, undecyl, and octadecyl and cycloalkyl groups such as cyclohexyl. Unsaturated aliphatic hydrocarbyls are exemplified by, but not limited to, alkenyl groups such as vinyl, allyl, butenyl, pentenyl, cyclohexenyl and hexenyl; and by alkynyl groups. Aromatic hydrocarbon groups are exemplified by, but not limited to, phenyl, tolyl, xylyl, benzyl, styryl, and 2-phenylethyl. Organyl groups are exemplified by, but not limited to, halogenated alkyl groups such as fluoroalkyl groups when a fluorosilicone polymer as discussed in detail below, chloromethyl and 3-chloropropyl; nitrogen containing groups such as amino groups, amido groups, imino groups, imido groups; oxygen containing groups such as polyoxyalkylene groups, carbonyl groups, alkoxy groups and hydroxyl groups. Further organyl groups may include sulfur containing groups, phosphorus containing groups and/or boron containing groups. The subscript "a" may be 0, 1, 2 or 3, but is typically mainly 2 or 3.

Siloxy units may be described by a shorthand (abbreviated) nomenclature, namely -"M," "D," "T," and "Q", when R is a methyl group (further teaching on silicone nomenclature may be found in Walter Noll, Chemistry and Technology of Silicones, dated 1962, Chapter 1, pages 1-9). The M unit corresponds to a siloxy unit where a=3, that is $R_3SiO_{1/2}$; the D unit corresponds to a siloxy unit where a=2, namely $R_2SiO_{2/2}$; the T unit corresponds to a siloxy unit where a=1, namely $R_1SiO_{3/2}$; the Q unit corresponds to a siloxy unit where a=0, namely $SiO_{4/2}$.

Examples of typical groups on the polydiorganosiloxane polymer (i) include mainly alkenyl, alkyl, and/or aryl groups. The groups may be in pendent position (on a D or T siloxy unit) or may be terminal (on an M siloxy unit). As previously indicated alkenyl and/or alkynyl groups are essential. Suitable alkenyl and/or alkynyl groups in polydiorganosiloxane polymer (i) typically contain from 2 to 10 carbon atoms, e.g. for alkenyl groups vinyl, isopropenyl, allyl, and 5-hexenyl. It is preferred that the alkenyl or alkynyl groups are alkenyl groups, alternatively vinyl groups.

The silicon-bonded organic groups attached to polydiorganosiloxane polymer (i) other than alkenyl and/or alkynyl radicals are typically selected from monovalent saturated hydrocarbon radicals, which typically contain from 1 to 10 carbon atoms, and monovalent aromatic hydrocarbon radicals, which typically contain from 6 to 12 carbon atoms, which are unsubstituted or substituted with groups that do not interfere with curing of this inventive composition, such as halogen atoms. Preferred species of the silicon-bonded organic groups are, for example, alkyl groups such as methyl, ethyl, and propyl; and aryl groups such as phenyl.

The molecular structure of polydiorganosiloxane polymer (i) is typically linear, however, there can be some branching due to the presence of T units (as previously described) within the molecule.

Polydiorganosiloxanes having a weight average molecular weight of from 200,000 to 800,000 g/mol as hereinbefore have viscosities of greater than 1,000,000 mPa·s and as such are highly viscous gums.

A polydiorganosiloxane gum typically has a viscosity of at least 1,000,000 mPa·s at 25° C. However, because of the difficulty in measuring viscosity of highly viscous fluids such as silicone gums, the gums tend to be described by way of their Williams plasticity values in accordance with ASTM D-926-08 rather than by viscosity. A polydiorganosiloxane gum (i) has a viscosity resulting in a Williams's plasticity of at least 30 mm/100 measured in accordance with ASTM D-926-08, alternatively at least 50 mm/100 measured in accordance with ASTM D-926-08, alternatively at least 100 mm/100 measured in accordance with ASTM D-926-08, alternatively from 100 mm/100 to 300 mm/100.

The polydiorganosiloxane polymer (i) may be selected from polydimethylsiloxanes, alkylmethylpolysiloxanes, alkylarylpolysiloxanes or copolymers thereof containing e.g. alkenyl and/or alkynyl groups and may have any suitable terminal groups, for example, they may be trialkyl terminated, alkenyldialkyl terminated or may be terminated with any other suitable terminal group combination providing each polymer contains at least two alkenyl or alkynyl groups (usually alkenyl groups) per molecule. Hence the Polydiorganosiloxane polymer (i) may be, for the sake of example, dimethylvinyl terminated polydimethylsiloxane, dimethylvinylsiloxy-terminated dimethylmethylphenylsiloxane, trialkyl terminated dimethylmethylvinyl polysiloxane or dialkylvinyl terminated dimethylmethylvinyl polysiloxane copolymers.

For example, a polydiorganosiloxane polymer (i) containing alkenyl or alkynyl groups at the two terminals may be represented by the general formula (II):

R'R"R'"SiO—(R"R'"SiO)$_m$—SiOR'"R"R'  (II)

In formula (II), each R' may be an alkenyl group or an alkynyl group, alternatively alkenyl groups, which typically contains from 2 to 10 carbon atoms. Alkenyl groups include but are not limited to vinyl, propenyl, butenyl, pentenyl, hexenyl an alkenylated cyclohexyl group, heptenyl, octenyl, nonenyl, decenyl or similar linear and branched alkenyl groups and alkenylated aromatic ringed structures. Alkynyl groups may be selected from but are not limited to ethynyl, propynyl, butynyl, pentynyl, hexynyl an alkynylated cyclohexyl group, heptynyl, octynyl, nonynyl, decynyl or similar linear and branched alkenyl groups and alkenylated aromatic ringed structures.

R" does not contain ethylenic unsaturation, Each R" may be the same or different and is individually selected from monovalent saturated hydrocarbon radical, which typically contain from 1 to 10 carbon atoms, and monovalent aromatic hydrocarbon radical, which typically contain from 6 to 12 carbon atoms. R" may be unsubstituted or substituted with one or more groups that do not interfere with curing of this inventive composition, such as halogen atoms. Alternatively, R" contains 1 to 6 carbon atoms, alternatively R" is a methyl group. R'" is R' or R".

In one embodiment the polydiorganosiloxanes present may be a mixture of component (i) described above together with a polydiorganosiloxane (i)(a) having a significantly greater alkenyl/alkynyl level than does component (i) i.e. an alkenyl/alkynyl content of from 7 to 9% wt. of the polymer (i)(a). Typically, the polydiorganosiloxane (i)(a) is a polydimethylmethylalkenylsiloxane having an alkenyl and/or alkynyl content vi of from 6.00 to 10% wt. of polymer (i) (a), alternatively from 7.00 to 9.00% wt. of polymer (i) (a). The alkenyl/alkynyl groups in the polymer (i) (a) are typically all vinyl groups. Such a polydimethylmethylalkenylsiloxane may have three unreactive end groups e.g. maybe trialkyl terminated or may contain vinyl terminal groups e.g. maybe dimethylvinyl terminated. Such polymers may be significantly less viscous that the gums of (i) above, e.g. may have a viscosity of from 10,000 to 500,000 mPa·s at 25° C., alternatively 10,000 to 150,000 at 25° C., alternatively 10,000 to 80,000 at 25° C., relying on the cup/spindle method of ASTM D 1084 Method B, using the most appropriate spindle from the Brookfield® RV or LV range for the viscosity range.

Polydiorganosiloxane polymer (i) is present in a composition as herein before described in an amount of from 30 to 75% by weight of the composition, alternatively from 30 to 70% by weight of the composition alternatively 30 to 65% by weight of the composition.

Polydiorganosiloxane polymer (i)(a) may have the same general chemical structure and/or viscosity as any of the structures described for polydiorganosiloxane polymer (i) above, however it must contain a much larger content of alkenyl or alkynyl groups i.e. from 7 to 9% wt. of alkenyl or alkynyl groups. The alkenyl and/or alkynyl content of polymer (i)(a) may also be determined using quantitative infrared analysis in accordance with ASTM E168. Typically, the alkenyl or alkynyl groups are alkenyl groups, alternatively alkenyl groups having from 2 to 6 carbons, alternatively vinyl.

Polydiorganosiloxane polymer (i)(a) is an optional ingredient. When present in the composition it may be present in an amount up to a maximum of 15% wt. of the composition, alternatively up to 12.5% wt. of the composition.

The composition herein may comprise a fumed silica filler (ii) and optionally a quartz filler (iii).

Fumed Silica (ii)

The finely divided fumed silica, having relatively high surface area, which is typically at least 50 m$^2$/g. Fumed silica having a surface area of from 100 to 595 m$^2$/g measured in accordance with the BET method, alternatively of from 100 to 500 m$^2$/g (using the BET method in accordance with ISO 9277: 2010), alternatively of from 100 to 400 m$^2$/g (using the BET method in accordance with ISO 9277: 2010), alternatively of from 150 to 400 m$^2$/g (using the BET method in accordance with ISO 9277: 2010) are typically used.

The amount of finely divided fumed silica (ii) used in the compositions described herein is typically present in an amount of from 28 to 40% wt. of the composition; alternatively from 28 to 36 weight % of the composition in the absence of quartz from the composition.

When the fumed silica (s) (ii) is/are naturally hydrophilic (e.g. untreated fumed silica fillers), it/they are typically treated with a treating agent to render them hydrophobic and thereby easier to mix into the polymer (i) and (i) (a) when the latter is present. The fumed silica may be treated prior to introduction in the composition or in situ (i.e. in the presence of at least a portion of the other components of the composition of the present invention by blending these components together until completely treated and uniformly dispersed into a homogeneous material). Typically, untreated fumed silica (ii) is treated in situ with a treating agent in the presence of at least one of polydiorganosiloxane polymers (i) and (i) (a) when the latter is present. The fumed silica is provided fumed silica provided to ensure for necessary mechanical strength and also quickly generate ceramic-like layer for thermal insulation under high temperature & high-pressure failing condition at same time.

The treating agents used to treat fumed silica (ii) may be selected from one or more of, for example, organosilanes, polydiorganosiloxanes, or organosilazanes, hexaalkyl disilazane, short chain siloxane diols, a fatty acid or a fatty acid ester such as a stearate to render one or more of the filler(s) hydrophobic and therefore easier to handle and obtain a homogeneous mixture with the other components. Specific examples include but are not limited to liquid hydroxyl-terminated polydiorganosiloxane containing an average from 2 to 20 repeating units of diorganosiloxane in each molecule which may optionally contain fluoro groups and or fluoro containing groups, if desired, hexaorganodisiloxane, hexaorganodisilazane, and the like. A small amount of water can be added together with the silica treating agent(s) as processing aid. The surface treatment of the fumed silica makes them easily wetted by polymers (i) and (i) (a) if the latter is present. These surface modified fumed silicas do not clump and can be homogeneously incorporated into polymers (i) and (i) (a) resulting in improved rheological behavior, such as lower viscosity and stability in viscosity during storage of the uncured compositions and improved room temperature mechanical properties of the cured compositions.

In one preferred embodiment the filler treating agent is a low molecular weight organosilicon compounds disclosed in the art applicable to prevent creping of organosiloxane compositions during processing.

Component (iii) is quartz a non-reinforcing type of silica and has a particle size of between 1 and 30 μm. Quartz may be added to at least partially replace some of the fumed silica. When present both the fumed silica and the quartz are present in an amount ≥10% wt. of the composition with the maximum total combined amount of fumed silica and quartz present being 40% wt. of the composition and the additional requirement that:

[Total % wt. fumed silica]+[half the % wt. of quartz] is ≥28% wt. of the composition.

The above are required in order to provide a suitable mechanical strength and also have the ability to quickly generate ceramic layer for thermal insulation under high temperature & high pressure failing condition at same time. If desired the calcium silicate, e.g. wollastonite, may be hydrophobically treated but this not essential.

Peroxide Catalyst (iv) (a)

The composition as described herein may be cured with an organic peroxide catalyst (iv) (a) or mixtures of different types of organic peroxide catalysts.

The organic peroxide catalyst may be any of the well-known commercial organic peroxides used to cure silicone rubber compositions. The amount of organic peroxide used is determined by the nature of the curing process, the organic peroxide used, and the composition used. Typically, the amount of organic peroxide catalyst utilised in a composition as described herein is from 0.2 to 3% wt., alternatively 0.2 to 2% wt. in each case based on the weight of the composition.

Suitable organic peroxides are substituted or unsubstituted dialkyl-, alkylaroyl-, diaroyl-peroxides, e.g. benzoyl peroxide and 2,4-dichlorobenzoyl peroxide, ditertiarybutyl peroxide, dicumyl peroxide, t-butyl cumyl peroxide, bis(t-butylperoxyisopropyl)benzene, bis(t-butylperoxy)-2,5-dimethyl hexyne, 2,4-dimethyl-2,5-di(t-butylperoxy) hexane, di-t-butyl peroxide, and 2,5-bis(tert-butyl peroxy)-2,5-dimethylhexane.

Alternatively the curing agent may be (iv) (b) a hydrosilylation cure package comprising (i) a hydrosilylation catalyst and (ii) an organopolysiloxane cross-linker having at least three hydrogen groups per molecule.

(iv)(b)(i) Hydrosilylation Catalyst

When present component (iv)(b)(i), a hydrosilylation catalyst is preferably one of the platinum metals (platinum, ruthenium, osmium, rhodium, iridium and palladium), or a compound of one or more of such metals. Platinum and platinum compounds are preferred due to the high activity level of these catalysts in hydrosilylation reactions.

Examples of preferred hydrosilylation catalysts (iv)(b)(i) include but are not limited to platinum black, platinum on various solid supports, chloroplatinic acids, alcohol solutions of chloroplatinic acid, and complexes of chloroplatinic acid with ethylenically unsaturated compounds such as olefins and organosiloxanes containing ethylenically unsaturated silicon-bonded hydrocarbon groups. The catalyst (iv)(b)(i) can be platinum metal, platinum metal deposited on a carrier, such as silica gel or powdered charcoal, or a compound or complex of a platinum group metal.

Examples of suitable platinum-based catalysts include
(i) complexes of chloroplatinic acid with organosiloxanes containing ethylenically unsaturated hydrocarbon groups are described in U.S. Pat. No. 3,419,593;
(ii) chloroplatinic acid, either in hexahydrate form or anhydrous form;
(iii) a platinum-containing catalyst which is obtained by a method comprising reacting chloroplatinic acid with an aliphatically unsaturated organosilicon compound, such as divinyltetramethyldisiloxane;
(iv) alkene-platinum-silyl complexes as described in U.S. Pat. No. 6,605,734 such as (COD)Pt(SiMeCl$_2$)$_2$ where "COD" is 1,5-cyclooctadiene; and/or
(v) Karstedt's catalyst, a platinum divinyl tetramethyl disiloxane complex typically containing about 1 wt. % of platinum in a solvent, such as toluene may be used. These are described in U.S. Pat. Nos. 3,715,334 and 3,814,730.

The hydrosilylation catalyst (iv)(b)(i) when present, is present in the total composition in a catalytic amount, i.e., an amount or quantity sufficient to catalyse the addition/hydrosilylation reaction and cure the composition to an elastomeric material under the desired conditions. Varying levels of the hydrosilylation catalyst (iv)(b)(i) can be used to tailor reaction rate and cure kinetics. The catalytic amount of the hydrosilylation catalyst (iv)(b)(i) is generally between 0.01 ppm, and 10,000 parts by weight of platinum-group metal, per million parts (ppm), based on the combined weight of the composition polymers (i) and (i) (a), filler (ii) and optionally filler (iii); alternatively, between 0.01 and 5000 ppm; alternatively, between 0.01 and 3,000 ppm, and alternatively between 0.01 and 1,000 ppm. In specific embodiments, the catalytic amount of the catalyst may range from 0.01 to 1,000 ppm, alternatively 0.01 to 750 ppm, alternatively 0.01 to 500 ppm and alternatively 0.01 to 100 ppm of metal based on the weight of the composition. The ranges may relate solely to the metal content within the catalyst or to the catalyst altogether (including its ligands) as specified, but typically these ranges relate solely to the metal content within the catalyst. The catalyst may be added as a single species or as a mixture of two or more different species. Typically, dependent on the form/concentration in which the catalyst package is provided the amount of catalyst present will be within the range of from 0.001 to 3.0% by weight of the composition.

(iv)(b)(ii) Organohydrogenpolysiloxane

Component (iv)(b)(ii) is an organohydrogenpolysiloxane, which functions as a cross-linker for curing polymers (i) and (ii), by addition/hydrosilylation reaction of the silicon-bonded hydrogen atoms in component (iv)(b)(ii) with the alkenyl groups in polymers (i) and (ii) catalysed by component (iv)(b)(i) described below. Component (iv)(b)(ii) normally contains 3 or more silicon-bonded hydrogen atoms so that the hydrogen atoms can react with the unsaturated alkenyl or alkynyl groups of polymers (i) and (ii) to form a network structure therewith and thereby cure the composition. Some or all of organohydrogenpolysiloxane (iv)(b)(ii) may alternatively have 2 silicon bonded hydrogen atoms per molecule when polymers (i) and (ii) each have >2 alkenyl or alkynyl groups per molecule.

The molecular configuration of component (iv)(b)(ii) is not specifically restricted, and it can be straight chain, branch-containing straight chain, or cyclic. While the molecular weight of this component is not specifically restricted, the viscosity is typically from 0.001 to 50 Pa·s at 25° C. relying on the cup/spindle method of ASTM D 1084 Method B, using the most appropriate spindle from the Brookfield® RV or LV range for the viscosity range, in order to obtain a good miscibility with polymers (i) and (ii).

Component (iv)(b)(ii) is typically added in an amount such that the molar ratio of the total number of the silicon-bonded hydrogen atoms in component (iv)(b)(ii) to the total number of all alkenyl radicals in polymers (i) and (ii) is from 0.5:1 to 20:1. When this ratio is less than 0.5:1, a well-cured composition will not be obtained. When the ratio exceeds 20:1, there is a tendency for the hardness of the cured composition to increase when heated.

Examples of component (iv)(b)(ii) include but are not limited to:
(i) trimethylsiloxy-terminated methylhydrogenpolysiloxane,
(ii) trimethylsiloxy-terminated polydimethylsiloxane-methylhydrogensiloxane,
(iii) dimethylhydrogensiloxy-terminated dimethylsiloxane-methylhydrogensiloxane copolymers,
(iv) dimethylsiloxane-methylhydrogensiloxane cyclic copolymers,
(v) copolymers composed of $(CH_3)_2HSiO_{1/2}$ units and $SiO_{4/2}$ units,
(vi) copolymers composed of $(CH_3)_3SiO_{1/2}$ units, $(CH_3)_2HSiO_{1/2}$ units, and $SiO_{4/2}$ units; and
copolymers containing $(CH_3)_2HSiO_{1/2}$ units and $(R^2Z)_d(R)_e SiO_{(4-d-e)/2}$ as described above. Alternatively, component (iv)(b)(ii) may be a filler, e.g. silica treated with one of the above.

The silicon-bonded hydrogen (Si—H) content of polymer is determined using quantitative infra-red analysis in accordance with ASTM E168. In the present instance the silicon-bonded hydrogen to alkenyl (vinyl) ratio is important when relying on a hydrosilylation cure process. Generally, this is determined by calculating the total weight % of alkenyl groups in the composition, e.g. vinyl [V] and the total weight % of silicon bonded hydrogen [H] in the composition and given the molecular weight of hydrogen is 1 and of vinyl is 27 the molar ratio of silicon bonded hydrogen to vinyl is 27[H]/[V].

As previously indicated when curing agent (iv) is (a) an organo peroxide a platinum metal, or a compound or complex of a platinum group metal (v) is provided in the composition. It is to be noted that in these circumstances said component (v) takes no part in the cure process because it is provided in the absence of an organohydrogenpolysiloxane and therefore a hydrosilylation cure process cannot take place. Component (v) may be any platinum species indicated in (iv)(b) (i) above and is provided in the same amounts as in (iv)(b) (i) above.

When the composition as hereinbefore described is being cured via an addition/hydrosilylation reaction component (vi) an inhibitor may be utilised to inhibit the cure of the composition. These inhibitors are utilised to prevent premature cure in storage and/or to obtain a longer working time or pot life of a hydrosilylation cured composition by retarding or suppressing the activity of the catalyst. Inhibitors of hydrosilylation catalysts, e.g. platinum metal-based catalysts are well known in the art and may include hydrazines, triazoles, phosphines, mercaptans, organic nitrogen compounds, acetylenic alcohols, silylated acetylenic alcohols, maleates, fumarates, ethylenically or aromatically unsaturated amides, ethylenically unsaturated isocyanates, olefinic siloxanes, unsaturated hydrocarbon monoesters and diesters, conjugated ene-ynes, hydroperoxides, nitriles, and diaziridines.

One class of known inhibitors of platinum catalysts includes the acetylenic compounds disclosed in U.S. Pat. No. 3,445,420. Acetylenic alcohols such as 2-methyl-3-butyn-2-ol constitute a preferred class of inhibitors that will suppress the activity of a platinum-containing catalyst at 25° C. Compositions containing these inhibitors typically require heating at temperature of 70° C. or above to cure at a practical rate.

Examples of acetylenic alcohols and their derivatives include 1-ethynyl-1-cyclohexanol (ETCH), 2-methyl-3-butyn-2-ol, 3-butyn-1-ol, 3-butyn-2-ol, propargyl alcohol, 2-phenyl-2-propyn-1-ol, 3,5-dimethyl-1-hexyn-3-ol, 1-ethynylcyclopentanol, 1-phenyl-2-propynol, 3-methyl-1-penten-4-yn-3-ol, and mixtures thereof.

When present, inhibitor concentrations as low as 1 mole of inhibitor per mole of the metal of catalyst (iv)(b)(i) will in some instances impart satisfactory storage stability and cure rate. In other instances, inhibitor concentrations of up to 500 moles of inhibitor per mole of the metal of catalyst (iv)(b)(i) are required. The optimum concentration for a given inhibitor in each composition is readily determined by routine experimentation. Dependent on the concentration and form in which the inhibitor selected is provided/available commercially, when present in the composition, the inhibitor is typically present in an amount of from 0.0125 to 10% by weight of the composition. Mixtures of the above may also be used.

When component (iv)(b) is relied upon to cure the composition, typically the composition will be stored in two parts, often referred to as Part A and Part B with a view to separating components (iv)(b)(ii) and (iv)(b)(i) prior to cure to avoid premature cure as will be discussed further below. Such 2-part compositions are composed to enable easy mixing immediately prior to use and are typically in a weight ratio of Part A:Part B of from 15:1 to 1:1. Furthermore, when component (vi) the cure inhibitor is present it is usually stored in the same part as the Additional Optional Components Additional optional components may be present in the silicone rubber composition depending on the intended use thereof. Examples of such optional components include pot life extenders, flame retardants, lubricants, non-reinforcing fillers, pigments, and mixtures thereof.

Further examples of additives include mold release agents, UV light stabilizers, bactericides, heat stabilizers, compression set improvement additives, and mixtures thereof.

Examples of flame retardants include aluminium trihydrate, chlorinated paraffins, hexabromocyclododecane, triphenyl phosphate, dimethyl methylphosphonate, tris(2,3-dibromopropyl)phosphate (brominated tris), and mixtures or derivatives thereof.

Examples of pigments include but are not limited to titanium dioxide, chromium oxide, bismuth vanadium oxide, iron oxides and mixtures thereof.

Examples of heat stabilizers include metal compounds such as red iron oxide, yellow iron oxide, ferric hydroxide, cerium oxide, cerium hydroxide, lanthanum oxide, copper phthalocyanine. Aluminium hydroxide, fumed titanium dioxide, iron naphthenate, cerium naphthenate, cerium dimethylpolysilanolate and acetylacetone salts of a metal chosen from copper, zinc, aluminum, iron, cerium, zirconium, titanium and the like. The amount of heat stabilizer present in a composition may range from 0.01 to 10% weight of the total composition.

Further examples of additives include mold release agents, UV light stabilizers, bactericides, heat stabilizers, compression set improvement additives, and mixtures thereof. When present, the calcium silicate utilised may have a maximum average particle size of 1 to 30 μm. Any form of calcium silicate which has the ability to form a char in the presence of fire may be utilised. This may include a calcium metasilicate, otherwise known as wollastonite. Wollastonite, is a naturally occurring mineral which may be provided in a number of forms, e.g. it may be provided in an acicular morphology, i.e. in a needle-like shape. Typically, the aspect ratio i.e. the ratio of the particle length to its diameter is at least 2:1. It is preferred for the wollastonite to have an average particle size of from about 2 to 15 μm and an aspect ratio of about 2:1 or greater, most preferably a particle size of about 2 μm and an aspect ratio of about 2:1. The wollastonite used in this invention has a low BET surface area, typically less than 25 m$^2$/g (using the BET method in accordance with ISO 9277: 2010). The calcium silicate e.g. wollastonite may be hydrophobically treated but it is not essential.

As discussed above, when cured via hydrosilylation the composition will be stored prior to use in two parts, part A and part B. Typically, part A will contain some of component (i) the polymer(s), some of components (ii) the fumed silica and optionally present quartz (iii) and hydrosilylation catalyst (iv)(b)(i) and part B will contain the remainder of components (i) (ii) and (iii) together with silicon bonded hydrogen (Si—H) containing cross-linker (iv)(b)(ii) and (vi) inhibitor when present. The two-part composition may be designed to be mixed together in any suitable ratio e.g. to enable easy mixing immediately prior to use and are typically in a weight ratio of PartA:PartB of from 15:1 to 1:1. In such situations the parts A and B compositions are prepared independently and are only mixed together shortly before use. In each instance a silicone base comprising polymer (i) and fillers (ii) and optionally (iii) may be prepared before the other ingredients are introduced into the respective part. When required a hydrophobing treating agent may be added when preparing the base to enable the filler(s) to be treated in situ.

When the composition is cured using a peroxide curative the composition as hereinbefore described may be prepared by combining all of components at ambient or elevated temperature as desired. In either case any suitable mixing techniques and devices described in the prior art can be used. The particular device to be used for mixing all the ingredients or combining parts A and B will be determined dependent on the viscosities of components. Although it is to be noted that as the polymer is usually a siloxane gum mixing apparatus able to mix gums may need to be used. Suitable mixers include but are not limited to paddle type mixers and kneader type mixers. Cooling of components during mixing may be desirable to avoid premature curing of the composition.

There is also provided a method of manufacturing the aforementioned ceramifiable elastomeric silicone material from a silicone rubber composition by mixing the components of the composition as described herein. The mixing step may involve mixing all the individual components together in the presence of a peroxide curative when the composition is in two parts, by mixing the two parts together. When the composition is in two or more parts, the parts may be mixed together in a suitable multi-part mixing system prior to cure.

The silicone rubber composition may, dependent on viscosity and application etc., be further processed by injection moulding, encapsulation moulding, press moulding, dispenser moulding, extrusion moulding, transfer moulding, press vulcanization, centrifugal casting, calendering, bead application or blow moulding.

Curing of the silicone rubber composition may be carried out as required by the type of cure package utilized. Typical curing temperatures may range of from 80 to 200° C., alternatively of from 100-170° C. The resulting elastomeric materials may be post cured for a suitable period at an appropriate temperature such as, for the sake of example, from 2 to 10 hours, alternatively from 4 to 10 hours in each case at a temperature of about 200° C.

Curing can for example take place in a mold to form a moulded silicone article. The composition may for example be injection moulded to form an article, or the composition can be overmolded by injection moulding around an article or over a substrate.

Preferably in any embodiment described above, the Shore A hardness is ≥60 when measured post cure in accordance with ASTM D2240-15.

The thermally insulating layer may be any suitable thickness but is designed so that the side thereof facing a malfunctioning battery cell ceramifies given the sudden enormous temperature increase whereas the other side of the thermally insulating layer preferably does not ceramify and remains elastomeric. The thickness of the thermally insulating layer may be from 0.2 mm to 4.0 cm. Thicker layers are believed to be too thick for practical use given the space available and the number of cells desired in a battery module. An insulating layer of <0.2 mm is understood to be too thin to provide sufficient thermal insulation for the purpose herein.

The battery module may further comprise:
a control circuit board disposed within the battery module casing; and
the thermally insulating layer may be at least partially disposed between the control circuit board and one or more battery cells.

The battery module as described herein may additionally an electrical or electronic circuit disposed within the battery module casing; and.

The article such as a battery module as described herein is designed to prevent or delay thermal runaway in the battery module.

As previously mentioned, there is also provided, a
Use of a ceramifiable elastomeric silicone material as a thermally insulating layer between adjacent battery cells in an article adapted to receive multiple battery cells, wherein said ceramifiable elastomeric silicone material is the cured product of a silicone rubber composition comprising:
(i) one or more polydiorganosiloxanes having a weight average molecular weight of from 200,000 to 800,000 g/mol having between 0.01 to 1% of alkenyl and/or alkynyl groups in an amount of from 30 to 70% wt. of the composition;
(ii) a fumed silica filler in an amount of from 28.0 to 40.0% wt. which fumed silica filler may be partially replaced with
(iii) quartz having a particle size of from 1 to 30 μm wherein when quartz is present, the fumed silica and the quartz are each present in an amount ≥10% wt. of the composition, the maximum total combined amount of fumed silica and quartz present is 40% wt. of the composition and that:
[Total % wt. fumed silica]+[half the % wt. of quartz] is ≥28% wt. of the composition;
(iv) a curing agent selected from
(a) an organic peroxide; or
(b) a hydrosilylation cure package comprising (b) (i) a hydrosilylation catalyst
and (b) (ii) an organopolysiloxane cross-linker having at least three hydrogen groups per molecule; and component (v) when curing agent (iv) is (a) an organo peroxide or optionally component (vi) when curing agent (iv) is (b) a hydrosilylation cure package wherein
(v) is a platinum metal, or a compound or complex of a platinum group metal; and
(vi) is a hydrosilylation cure inhibitor.

The articles described herein are suitable for use in a wide variety of applications such as in electric-vehicle battery (EVB) power supplies for electric and hybrid (electric and petrol/diesel) powered vehicles, i.e. in battery packs/systems used to power the propulsion system of electric and hybrid vehicles and as such are designed to give power over sustained periods of time. As previously discussed, battery packs store the electricity used by the motor to drive a vehicle's wheels. In the case of hybrid type electric vehicles, the propulsion system is powered by a battery pack much like the above but a combustion engine is also present and as such hybrid vehicles run on electric power until the battery is depleted and then switch over to carbon based fuel which powers an internal combustion engine.

BRIEF DESCRIPTION OF THE FIGURES

The accompanying figures are included to provide further understanding, and to illustrate exemplary embodiments and, together with the description, serve to enhance the understanding of the disclosure herein.

In FIG. 1 there is provided a series of prismatic battery cells (1a-1h) e.g. lithium-ion battery cells in a battery module with the outer casing not shown. Such battery modules may be used in power sources for driving electric vehicles and hybrid electric vehicles and the like as discussed above. Adjacent battery cells (1a-h) sandwich a corresponding thermally insulating layer (2a-g). Whilst not shown it will be understood that each battery comprises an anode, a cathode and electrolyte and may be any suitable battery cell. At each end of the row of alternating battery cells (1a-h) and thermally insulating layers (2a-g) is provided a cell end plate (3). Whilst not shown in FIG. 1 the alternating prismatic battery cell (1 a-h) and thermally insulating layers (2a-g) depicted are retained in a battery module casing. Positive electrode terminals are identified as (4) in FIG. 1. The battery cells (1a-h) are each electrically connected in series and/or in parallel as desired for the end purpose with the positive electrode terminal being electrically connected to a positive electrode plate through a positive electrode collector, and the negative electrode terminal is electrically connected to the negative electrode plate through a negative electrode collector. By providing the thermally insulating layers (2a-g) between adjacent battery cells the users of the article being powered or partially powered e.g. a vehicle are provided with a battery module designed for preventing thermal runaway propagation throughout the battery cells in the battery module using thermally insulating layers (2a-g).

In use, if, for example, battery cell (1d) were to malfunction and enter or approach thermal runaway, thermally insulating layers (2c and (2d) partially ceramify and insulate battery cells (1c) and (1e) from the dramatic increase in temperature in battery cell (1d) and either delay or prevent the propagation of the thermal runaway phenomenon within the battery module.

Figure 1:
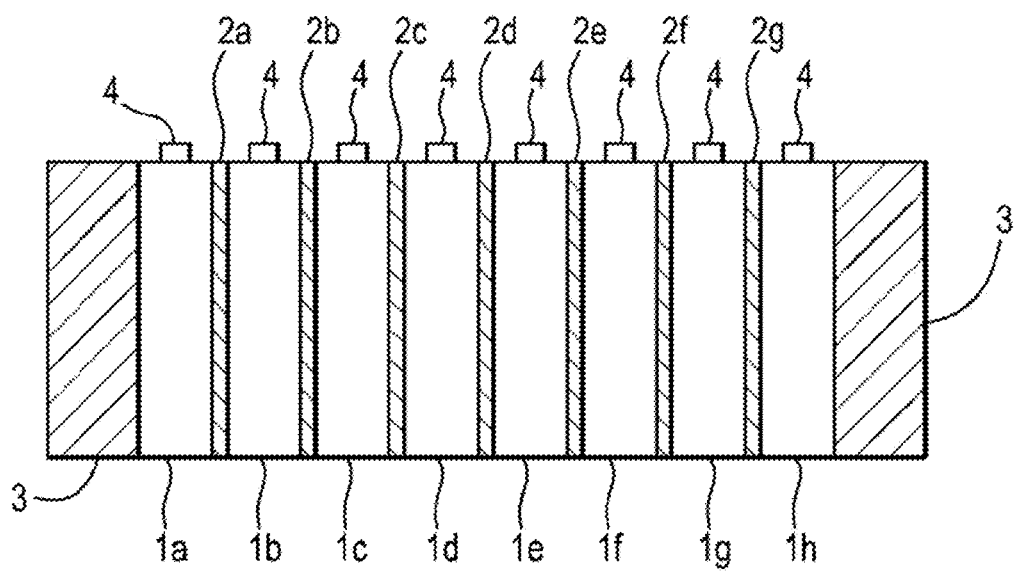
FIG. 1 is a representation of a battery module as described herein using prismatic shaped batteries, for the ease of explanation.
Figure 2A:
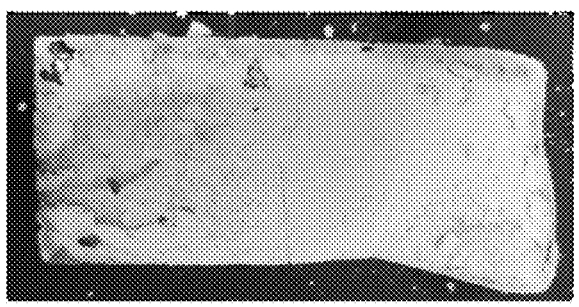
FIG. 2a is a photograph of a ceramified side of the thermally insulating layer as described herein after testing
Figure 2B:
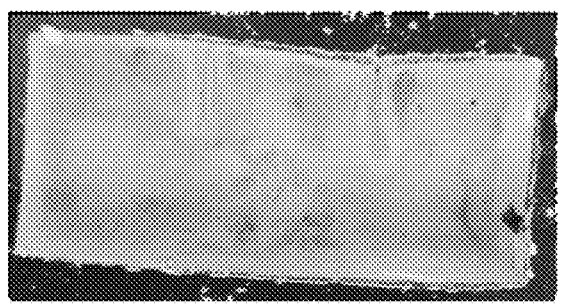
FIG. 2b is a photograph of a non-ceramified side of the thermally insulating layer as described herein after testing showing it still has its elastomeric character.

FIG. 2a is a photo of a ceramified side of a thermal insulating layer test piece used in the examples and FIG. 2b shows the elastomeric surface of the side remote from heating remaining elastomeric in appearance.

The following examples, illustrating the compositions and components of the compositions, elastomers, and methods, are intended to illustrate and not to limit the invention.

EXAMPLES

A series of examples (Ex.1-Ex.7) and comparative examples (C.1-C.4) were prepared by mixing all the components in the compositions detailed below. Silicone bases were initially prepared in accordance with Table 1 and then the bases were utilised as indicated to make the compositions in Tables 2a and 4a.

Unless otherwise indicated Mw was determined using Gel permeation chromatography (GPC), All viscosities were measured at 25° C. relying on the cup/spindle method of ASTM D 1084 Method B, with the most appropriate spindle from the Brookfield® RV or LV range for the viscosity range, unless otherwise indicated. The alkenyl and/or alkynyl and/or silicon bonded hydrogen (Si—H) content of the components was determined using quantitative infra-red analysis in accordance with ASTM E168.

The filler(s) and filler treating agent(s) were first mixed with and evenly dispersed into the silicone polymer gum(s) to form a silicone rubber base. When relying on an organo peroxide catalyst, the remaining components were then added and dispersed into the respective base and the final compositions were press cured for 10 minutes at a suitable temperature. In the case of 2,5-Dimethyl-2,5-di(tert-butylperoxy)hexane (DHBP) catalyst containing compositions the cure temperature used was 170° C. In the case of bis(2,4-Dichloro Benzoyl) Peroxide catalyst containing compositions the cure temperature used was 120° C. and likewise the platinum cured compositions were cured for 10 minutes at 120° C. Some samples were post cured for 8 hours at 200° C. When reliant on hydrosilylation cure the composition was prepared in two parts which were subsequently mixed together in a predetermined ratio shortly prior to use.

TABLE 1

| Silicone rubber bases used in examples | | | |
|---|---|---|---|
| Components | Base A | Base B | Base C |
| Dimethylvinyl terminated dimethyl polysiloxane gum having a Mw of about 500,000 g/mol and a vinyl content of 0.014 wt. % | 36.91 | 68.0 | 29.76 |
| Dimethylvinyl terminated dimethyl methylvinyl polysiloxane gum a Mw of about 500,000 g/mol and a vinyl content of 0.065 wt. % | 36.91 | | 29.76 |

TABLE 1-continued

Silicone rubber bases used in examples

| Components | Base A | Base B | Base C |
|---|---|---|---|
| Dimethylvinyl terminated dimethyl methylvinyl polysiloxane, having a viscosity of 14,000 mPa · s and a vinyl content of 7.7 wt. % | | 1.8 | |
| Dimethylhydroxy terminated polydimethylsiloxane having a viscosity of about 45 mPa · s | 7.0 | | 6.0 |
| Dimethylhydroxy terminated polydimethylsiloxane having a viscosity of about 15 mPa · s | | 4.0 | |
| Fumed silica having a BET surface area of approx. 250 m$^2$/g | 19.00 | 26.0 | 34.00 |
| Methyl vinyl diol Dimethylhydroxy terminated polydimethylmethylvinylsiloxane viscosity of about 30 mPa · s at 25° C. and vinyl content of about 12.0 wt. % | 0.180 | 0.2 | 0.480 |

The compositions used in the Examples are provided in Table 2a.

TABLE 2a

Compositions of Examples

| | Ex.1 | Ex. 2 | Ex. 3 | Ex. 4 | Ex. 5 | Ex. 6 | Ex. 7 |
|---|---|---|---|---|---|---|---|
| Base A | 74.94 | 69.56 | 37.94 | | | | 38.00 |
| Base B | | | | | | 49.00 | 24.87 |
| Base C | | | 49.00 | 97.50 | 98.00 | 49.00 | |
| Wollastonite, 15 µm | | | | | | | 10.96 |
| CaSiO$_3$ (Chem reac.) 15 µm | | | | | | | 11.49 |
| Quartz, 5 µm | 22.12 | 28.44 | 11.06 | | | | 12.36 |
| Pt solution | | | | | | | 0.19 |
| Cerium hydroxide masterbatch | 1.00 | 1.00 | 1.00 | 1.00 | 1.00 | 1.00 | 1.13 |
| DHBP masterbatch | | 1.00 | 1.00 | | 1.00 | 1.00 | 1.00 |
| DCBP masterbatch | | | | 1.50 | | | |
| Inhibitor masterbatch | 0.14 | | | | | | |
| SiH cross-linker masterbatch | 0.9 | | | | | | |
| Pt catalyst MB | 0.9 | | | | | | |

In the above table
Pt solution is a Platinum catalyst in a solution of polydimethylsiloxane having about 5000 ppm of platinum metal with respect to the rest of the composition;
Cerium hydroxide masterbatch is a 50:50 by weight masterbatch of cerium hydroxide in a polydimethylsiloxane polymer having a Mw of 500,000 g/mol';
DCBP masterbatch is a 50:50 by weight masterbatch of bis(2,4-Dichloro Benzoyl) Peroxide catalyst in polydimethylsiloxane polymer;
DHBP masterbatch is a 50:50 by weight masterbatch of 2,5-Dimethyl-2,5-di(tert-butylperoxy)hexane catalyst in 40% Polydimethylsiloxane polymer and 10% silica; the quartz used was Min-u-sil® 5 µm obtained from US Silica; the Si—H cross-linker is 83% by weight of an Si—H containing silicone resin having 6400 ppm of Si—H bonds and 17% of silica wherein the silica functions as a carrier; and Inhibitor masterbatch consists of 4.8% by weight of ethynyl-1-cyclohexanol (ETCH) in in a silicone rubber masterbatch.

TABLE 2b

The amounts of individual ingredients introduced as part of Rubber base A, B or C in Table 2a.

| Key ingredients | Ex. 1 | Ex. 2 | Ex. 3 | Ex. 4 | Ex. 5 | Ex. 6 | Ex. 7 |
|---|---|---|---|---|---|---|---|
| Vinyl-term PDMS polymer having a MW of 500,000 and vi of 0.010% | 27.73 | 25.73 | 28.73 | 29.25 | 29.4 | 48.0 | 30.97 |
| Vinyl-term PDMS polymer having a MW of 500,000 and vi of 0.065% | 27.73 | 25.73 | 28.73 | 29.25 | 29.4 | 14.7 | 14.06 |

TABLE 2b-continued

The amounts of individual ingredients introduced as part of Rubber base A, B or C in Table 2a.

| Key ingredients | Ex. 1 | Ex. 2 | Ex. 3 | Ex. 4 | Ex. 5 | Ex. 6 | Ex. 7 |
|---|---|---|---|---|---|---|---|
| High vinyl PDMS polymer having a Mw of ~46,000 and vi of 7.7% | | | | | | 0.91 | 0.46 |
| Cumulative wt. % of all Silicone polymers or fluids | 59 | 53 | 62.5 | 65.43 | 65.43 | 69.5 | 52 |
| Silica | 18.9 | 18.9 | 26.7 | 34.57 | 34.57 | 30.0 | 13.86 |
| Quartz | 22.1 | 28.62 | 11.06 | | | | 12.36 |
| Total (silica + 1/2 quartz) | 29.95 | 33.21 | 32.23 | 34.57 | 34.57 | 30 | |

Physical property results for the respective compositions/elastomers are shown, together with the test methods used, in Tables 3a and 3b with respect to the Examples.

TABLE 3a

Physical property results of examples

| Test | Ex. 1 | Ex. 2 | Ex. 3 | Ex. 4 | Ex. 5 | Ex.6 | Ex. 7 |
|---|---|---|---|---|---|---|---|
| Shore A Durometer (ASTM D2240-15) | 73 | 81 | 72 | 70 | 75 | 63 | 79 |
| Specific gravity (ASTM D792-00) | 1.318 | 1.42 | 1.261 | 1.2042 | 1.205 | 1.1735 | 1.399 |

Thermal Insulation Test Procedure and Conditions:

The thermal testing was undertaken on a 0.5 MTon Hydraulic press supplied by Zhejiang Taizhou Mingen Hydraulic Equipment Fabrication Co. It had a heatable base plate, an aluminium sample plate and a hydraulically powered top plate.

Test specimens were prepared having the dimensions 8 cm length, 4 cm width and approximately 2 mm thickness and had a total surface area of 0.1092 m$^2$.

Each test specimen was mounted on the center of the aluminium sample plate. The surface area of the face of the specimen in direct contact with the heatable base plate was 0.0032 m$^2$. A 10 kg steel loading was used which equated to a pressure of 0.0306 MPa after removing hydraulic pressing.

The Heat insulation tests were carried out at 595° C. and at 500° C. For the 595° C. test, samples were heated at 595° C. during the test period of 20 minutes with the first 7 minutes under a pressure of approximately 0.9 MPa and the remaining 13 minutes at a pressure of approximately 0.03 MPa as described above. The heated base plate of the press was first heated to about 595° C. (or 500° C. depending on the test selected) and once this temperature was reached the temperature of the heated plate was stabilized at 595° C. The test piece was then placed on the hot plate and the aluminum plate was placed on top of the sample sandwiching the sample between the heated base plate and the aluminium plate. The 10 kg steel loading plate was immediately put on the aluminum plate, and an additional 0.87 MPa pressure was applied using the hydraulic press to start the test. After 420 sec, the hydraulic pressure was removed, but the 10 kg steel loading was maintained on top of the Aluminium plate so as to maintain a pressure of 0.03 MPa on the sample for the remaining 780 seconds of the test period. Both heat stage temperature and test specimen back temperature were recorded during the test. After total time of 1200 sec, the test was stopped, steel loading and Aluminium plate was removed from the heat stage.

The temperatures of the directly heated face and the back face of the sample of thermally insulating layer under test were measured and compared using a WRNK-191 0.5*350 mm thermocouple from Taizhou Cesmooy.

TABLE 3b

Thermal insulation Testing Results of Examples

| | Ex. 1 | Ex. 2 | Ex. 3 | Ex. 4 | Ex. 5 | Ex.6 | Ex. 7 |
|---|---|---|---|---|---|---|---|
| Heat face temp (° C.) after heating at 595° C. | 595 | 595 | 595 | 595 | 595 | 595 | 595 |
| Back face temp (° C.) after heating at 595° C. | 177 | 215.6 | 178 | 187.5 | 175 | 196.9 | 180 |
| Heat face temp (° C.) after heating at 500° C. | | 500 | | 500 | | | |
| Back face temp (° C.) after heating at 500° C. | | 153 | | 141.6 | | | |

The compositions used in the Examples are provided in Table 4a.

TABLE 4a

Compositions of comparative examples

| Ingredients | Comp. 1 | Comp. 2 | Comp. 3 |
|---|---|---|---|
| Base A | | 82.20 | 98.00 |
| Base B | 98.00 | | |
| Quartz, 5 μm | | 15.8 | |
| Cerium hydroxide MB | 1.00 | 1.00 | 1.00 |
| DHBPMB | 1.00 | 1.00 | 1.00 |
| Coated Aerogel | | | |
| | 100.00 | 100.00 | 100.00 |

The cerium hydroxide masterbatch and the DHBP masterbatch are the same as described above.

TABLE 4b

Amounts of the ingredients contained in the bases

| Key ingredients | Comp. 1 | Comp. 2 | Comp. 3 |
|---|---|---|---|
| Vinyl-term PDMS polymer having a Mw of 500,000 and vi of 0.010% | 66.64 | 30.41 | 36.26 |
| Vinyl-term PDMS polymer having a Mw of 500,000 and vi of 0.065% |  | 30.41 | 36.26 |
| High vinyl PDMS polymer having a Mw of ~46,000 and vi of 7.7% | 1.81 |  |  |
| Silicone polymer or fluid | 74.0 | 66 | 82 |
| Silica | 26.0 | 18.8 | 18.8 |
| Quartz |  | 15.80 |  |
| Total (silica + 1/2 quartz) | 26 | 26.7 | 18.8 |

Physical property results for the respective compositions/elastomers are shown, together with the test methods used, in Tables 5a and 5b with respect to the comparatives.

TABLE 5a

Physical Test of Comparative examples

| Test | Comp. 1 | Comp. 2 | Comp. 3 |
|---|---|---|---|
| Shore A Durometer (ASTM D2240-15) | 51 | 59 | 41 |
| Specific gravity (ASTM D792-00) | 1.1437 | 1.247 | 1.096 |

TABLE 5b

Thermal insulation Testing Results of Comparative examples

| | Comp. 1 | Comp. 2 | Comp. 3 |
|---|---|---|---|
| Heat face temp (° C.) after heating at 595° C. | 595 | 595 | 595 |
| Back face temp (° C.) after heating at 595° C. | 430.8 | 388.6 | 454.8 |
| Heat face temp (° C.) after heating at 500° C. |  |  | 500 |
| Back face temp (° C.) after heating at 500° C. |  |  | 321.8 |

The examples provide a much improved rear plate temperature when compared with the comparative Examples. It was also noted that the side of samples facing the heated plate during the heat testing underwent at least partial ceramification where the side remote from the heating plate gave much lower temperature values and visually appeared to be elastomeric. Furthermore, the temperatures of the equivalent remote faces from the heating plate were much lower than those of the comparative examples. It is believed that these results are also improved compared to the commercially available coated aerogel products.

Hence thermally insulating layers as hereinbefore described using the specified fumed silica (amorphous $SiO_2$) or fumed silica (amorphous $SiO_2$)+quartz (crystalline $SiO_2$) loading are able to quickly generate a ceramic-like layer on the heat face for thermal insulation at high temperature (595° C.) & high pressure (0.9 MPa) testing conditions whilst the remote face temperature can keep lower than that of comparative examples and we believe aerogel felt materials currently used (180~240° C. vs 260~450° C.) and are able to maintain an elastomeric appearance. It was also noted that thermally insulating layers as described herein are substantially dust free unlike commercially available coated aerogel materials and as such would not require the same level of protective equipment as needed when using said commercially available coated aerogel materials.

What is claimed is:

1. An article adapted to receive multiple battery cells which provides thermal insulation between adjacent battery cells by the provision of a thermally insulating layer of a ceramifiable elastomeric silicone material between adjacent battery cells, which ceramifiable elastomeric silicone material is a cured product of a silicone rubber composition comprising:
   (i) one or more polydiorganosiloxanes having a weight average molecular weight of from 200,000 to 800,000 g/mol, having between 0.01 to 1% of alkenyl and/or alkynyl groups and present in an amount of from 30 to 70% wt. of the composition;
   (ii) a fumed silica filler present in an amount of from 28.0 to 40.0% wt. which fumed silica filler (ii) may be partially replaced with (iii) quartz having a particle size of from 1 to 30 μm;
   wherein when the quartz (iii) is present, the fumed silica (ii) and the quartz (iii) are each present in an amount ≥10% wt. of the composition, the maximum total combined amount of fumed silica (ii and quartz iii) present is 40% wt. of the composition and provided that:
   ([total % wt. fumed silica (ii)]+[half the % wt. of quartz (iii)]) is ≥28% wt. of the composition:
   (iv) a curing agent selected from:
      (a) an organic peroxide; or
      (b) a hydrosilylation cure package comprising;
         (b) (i) a hydrosilylation catalyst, and
         (b) (ii) an organopolysiloxane cross-linker having at least three hydrogen groups per molecule; and
   component (v) when curing agent (iv) is (a) an organic peroxide or optionally component (vi) when curing agent (iv) is (b) a hydrosilylation cure package; wherein:
   (v) is a platinum metal, or a compound or complex of a platinum group metal; and
   (vi) is a hydrosilylation cure inhibitor.

2. The article in accordance with claim 1, wherein the battery cells are lithium-ion battery cells.

3. The article in accordance with claim 1, having a battery module comprising a casing adapted to receive multiple battery cells and a thermally insulating layer of the ceramifiable elastomeric silicone material.

4. The article in accordance with claim 1, having a battery module comprising a casing, a plurality of battery cells and a thermally insulating layer of the ceramifiable elastomeric silicone material sandwiched between adjacent battery cells.

5. The article in accordance with claim 1, comprising a battery pack of at least one battery module.

6. The article in accordance with claim 1, wherein the quartz (iii) is present and has a particle size of from 1 to 30 μm.

7. The article in accordance with claim 1, wherein the thickness of the thermally insulating layer is between 0.2 mm and 4 cm.

8. A method for thermally insulating adjacent battery cells in an article designed to receive multiple battery cells by the provision of a thermally insulating layer of ceramifiable elastomeric silicone material between said adjacent battery cells, which ceramifiable elastomeric silicone material is a cured product of a silicone rubber composition comprising:
   (i) one or more polydiorganosiloxanes having a weight average molecular weight of from 200,000 to 800,000 g/mol, having between 0.01 to 1% of alkenyl and/or alkynyl groups and present in an amount of from 30 to 70% wt. of the composition;

(ii) a fumed silica filler present in an amount of from 28.0 to 40.0% wt. which fumed silica filler (ii) may be partially replaced with (iii) quartz having a particle size of from 1 to 30 μm;

wherein when the quartz iii is present, the fumed silica (ii) and the quartz (iii) are each present in an amount ≥10% wt. of the composition, the maximum total combined amount of fumed silica (ii and quartz iii) present is 40% wt. of the composition and provided that:

([total % wt. fumed silica (ii)]+[half the % wt. of quartz (iii)]) is ≥28% wt. of the composition:

(iv) a curing agent selected from:
  (a) an organic peroxide; or
  (b) a hydrosilylation cure package comprising;
    (b) (i) a hydrosilylation catalyst, and
    (b) (ii) an organopolysiloxane cross-linker having at least three hydrogen groups per molecule; and component (v) when curing agent (iv) is (a) an organic peroxide or optionally component (vi) when curing agent (iv) is (b) a hydrosilylation cure package; wherein:

(v) is a platinum metal, or a compound or complex of a platinum group metal; and (vi) is a hydrosilylation cure inhibitor.

9. The method in accordance with claim 8, wherein the battery cells are lithium-ion battery cells.

10. The method in accordance with claim 8, wherein the quartz (iii) is present and has a particle size of from 1 to 30 μm.

\* \* \* \* \*